Oct. 17, 1939.   G. WUNSCH   2,176,807
ATTITUDE RESPONSIVE DEVICE FOR CRAFT
Filed Nov. 8, 1937
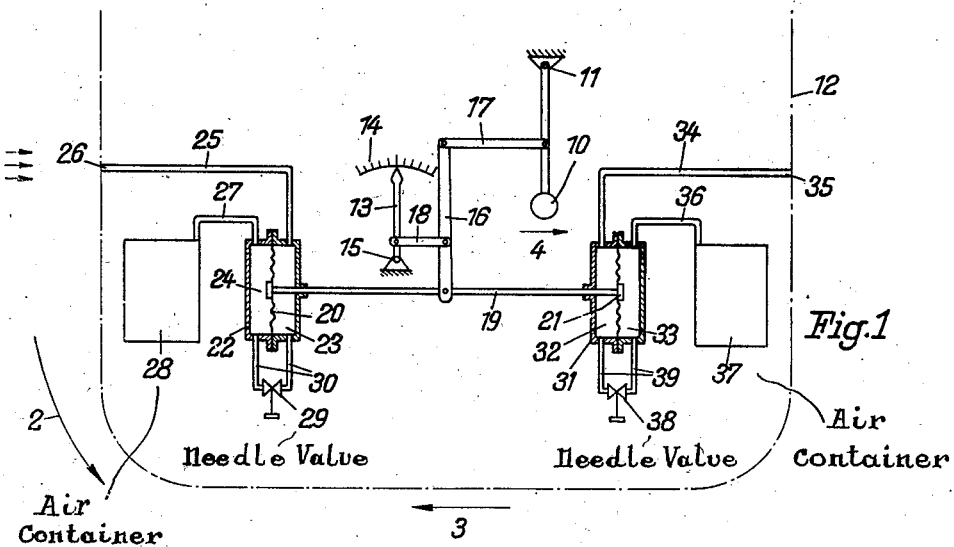
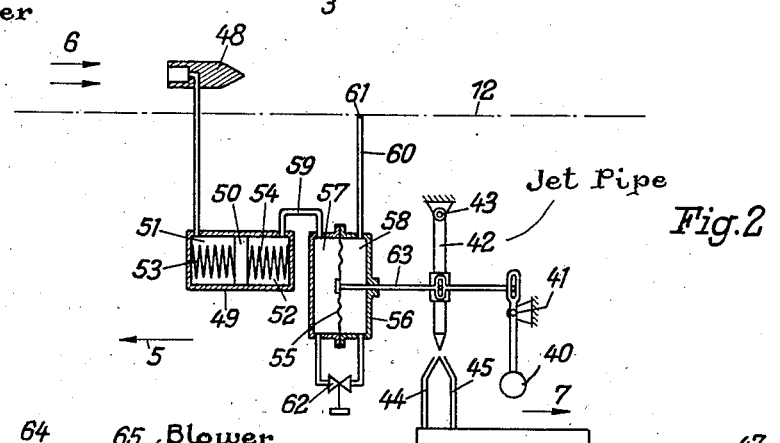
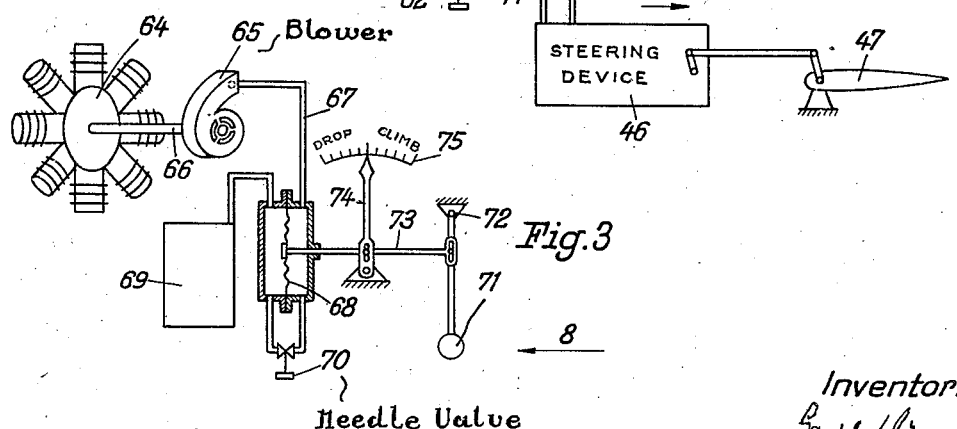
Inventor:

Patented Oct. 17, 1939

2,176,807

UNITED STATES PATENT OFFICE 2,176,807

ATTITUDE RESPONSIVE DEVICE FOR CRAFT

Guido Wünsch, Berlin-Steglitz, Germany, assignor to Askania-Werke A. G., a corporation of Germany Application November 8, 1937, Serial No. 173,544
In Germany November 9, 1936

5 Claims. (Cl. 73—151)

This invention relates to attitude responsive devices for craft, more particularly to devices for determining the true vertical direction.

This invention aims at providing for movable craft such as aircraft, ships, submarines, and the like, a simple and reliable instrument for determining the true vertical direction irrespective of acceleration forces acting on the device in the direction of travel of the craft or at an angle thereto and hereinafter referred to as ballistic forces.

To illustrate an object of this invention it may be assumed that for determining the true vertical direction a pendulous mass be mounted on board aircraft free to oscillate parallel to the longitudinal axis of the craft. It may be assumed that the longitudinal axis of the craft on which the pendulum is mounted be inclined with respect to the horizontal to cause the airplane to descend at an increasing rate of speed. The pendulum, normally tending to assume a vertical direction under the influence of the gravitational force will additionally be influenced by an acceleration force due to the increasing speed of the descending plane. This ballistic force acts in opposition to the gravitational force and may be sufficiently great to maintain the pendulum in a position relatively to the craft which it assumed during normal horizontal flight thereby deceiving the pilot about the true attitude of the craft. The acceleration force may even be great enough to overcome the action of the gravitational force to some extent and cause the pendulum to assume a position normally indicative of climbing.

It is accordingly an object of this invention to provide a reliable attitude responsive device by combination of a pendulous mass with means responsive to linear accelerations to compensate the pendulum against ballistic forces which would introduce a positional error into the device.

Further aims, objects, and advantages of this invention will appear from a consideration of the description and the accompanying drawing showing for purely illustrative purposes an embodiment of this invention. It is to be understood, however, that the description is not to be taken in a limiting sense, the scope of this invention being defined in the appended claims.

Referring to the drawing:

Fig. 1 is a diagrammatic illustration of a device for indicating lateral inclination of a craft.

Fig. 2 is diagrammatic illustration of a device responsive to longitudinal inclination of a craft.

Fig. 3 is a modified form of the device shown in Fig. 2.

Referring to Fig. 1 a pendulous mass 10 is mounted at 11 for swinging or oscillating movement transversely to the direction of travel of a craft, the body of the craft being indicated by dash-dot line 12. A movable member, in the illustrated example a pointer 13 cooperating with a graduated scale 14 is pivoted at 15 and connected to be operated by the pendulous mass 10 by means of a motion transmitting connection. In the illustrated example there is shown a double armed lever 16 connected to the pendulum and the pointer by links 17 and 18, respectively. The other arm of the lever 16 is pivotally connected to a rod 19 connecting diaphragms 20 and 21. The lever 16 thus constitutes a differential connection actuating the movable member 13 in response to movements of the pendulum as well as the connecting rod 19.

In order to compensate acceleration influences tending to displace the pendulum from the true vertical direction an acceleration responsive device is provided, in the illustrated embodiment shown as being of the fluid pressure type.

The diaphragm 20 connected to one end of the rod 19 is enclosed within a casing 22 separating the latter into chambers 23 and 24. The chamber 23 is connected to the dynamic pressure exerted by the fluid surrounding the craft by means of a conduit 25 terminating in a port 26 located at the port-side of the body of the craft 12. The other chamber 24 is connected by means of a conduit 27 to a container 28 with a charge of compressible fluid such as air, gas, or the like. Both chambers are connected by means of a throttle preferably of the capillary type and indicated at 29 in a connecting conduit 30.

A similar arrangement is provided for the starboard side of the craft. The diaphragm 21 is enclosed for this purpose within a casing 31 forming chambers 32 and 33 therewith. The chamber 32 is connected by means of a conduit 34 to a port 35 located at the star-board side for receiving the dynamic pressure of the surrounding fluid exerted on this side. The second chamber 33 is connected by means of a conduit 36 to a container 37 likewise provided with a charge of compressible fluid. Both diaphragm chambers 32 and 33 are in communication with each other through a throttle 38 in a conduit 39.

The operation of each acceleration responsive device is as follows:

A temporary variation in pressure at the port 26 such as would be caused by a side slip will create a flow in the conduit 25 through the chambers 23 and 24 into the container 28 compressing the fluid therein. As the flow from chamber 23 to 24 is restricted by the throttle 29 temporarily a greater pressure will exist in the chamber 23 which after some time will become equal to the pressure in the chamber 24 and the container 28, unless the pressure at 26 rises to a still greater magnitude. The time factor determining the lapse of time during which the pressures between chambers 23 and 24 become equalised is adjustable by means of the throttle 29.

When the rate of pressure change at 26 is small the action of the flow on the diaphragm 20 will be small as in this instance the relatively small flow will find no considerable resistance at the throttle 29. When the pressure change at 26 and, correspondingly, the flow through the conduit 25 is great the action of the flow on the diaphragm 20 will be great as the greater flow will require considerable time to find its way through the restricted passage at 29 creating a condition of differential pressure in the meantime. It therefore follows that the differential pressure acting on the diaphragm 20 is a function of the rate of the pressure change at 26. If the throttle 29 of the capillary type is employed the differential pressure will be linearly proportional to the flow through the conduit 25 and also to the rate of pressure change at the port 26.

The operation of the device shown in Fig. 1 will now be understood.

It may be assumed that the device be mounted on an airplane 12 for indicating the lateral inclination, or bank, of the ship. Assuming further that the left wing of the airplane be tipped downwardly to bank the plane in the direction of the arrow 2 the indicator 13 is expected to move to the left in response to a clockwise movement of the pendulum 10. Inasmuch as a banked plane has the tendency to sideslip with increasing speed in the direction of the arrow 3 it follows that a ballistic force is exerted on the pendulous mass in the direction of the arrow 4 tending to move the same counter-clockwisely in opposition of the gravitational force. On account of the sideslip the dynamic pressure on the port 26 located at the port side of the craft will be increased, setting up a flow through the conduit 25 in the hereinbefore described manner. The diaphragm 20 will accordingly be deflected to the left in response to the rate of the side slipping movement.

The action of the diaphragm 20 is aided by the diaphragm 21 as follows:

On account of the side slipping movement the pressure at the port 35 is decreased causing a flow of compressible pressure fluid from the chamber 37 through the throttle 38 and the conduit 34 into the surrounding air. On account of the resistance caused by the throttle 38 a differential pressure will again be created acting on the diaphragm 21 causing the same to move the rod 19 to the left. The lower end of the double armed lever 16 will accordingly be moved a definite amount which can be made by proper adjustment of the apparatus to be equal to the deflection of the pendulous mass under the influence of the ballistic forces. The action of these forces on the movable member 13 is thus compensated and the member is moved as though it were controlled by a pendulum unaffected by accelerations.

In the embodiment shown in Fig. 2 a pendulous mass 40 is pivotally mounted at 41 for oscillating movement in a plane parallel to the direction of flight of the craft indicated by an arrow 5. In this embodiment a movable member 42 in the form of a pressure fluid relay of the well-known Ascania jet-pipe type is shown as connected to the pendulum for actuation by the latter. The jet-pipe is pivoted at 43 and supplied with pressure fluid from a suitable source (not shown). The jet-pipe issues a jet of pressure fluid into reception orifices 44 and 45 for controlling in a well-known manner a steering device 46 for actuating an elevator 47.

The acceleration responsive device of the pressure fluid type is connected to act on the movable member 42 in addition to the pendulous mass 40 to compensate for ballistic influences on the pendulum.

An orifice 48 receiving dynamic pressure exerted on the craft in the direction of arrows 6 is connected to a cylinder 49 containing a movable piston 50 dividing the cylinder into chambers 51 and 52. Means are provided for biasing the piston relatively to the cylinder into a predetermined position.

In the illustrated embodiment biasing springs 53 and 54 are shown for this purpose. A diaphragm 55 is enclosed within a casing 56 dividing the same into chambers 57 and 58. The chamber 57 communicates with the chamber 52 through a conduit 59 while the second chamber 58 is connected to receive static pressure through a conduit 60 terminating at a port 61 at the surface of the body of the craft 12. The diaphragm chambers 57 and 58 are in communication with each other over an adjustable throttle 62 preferable of the capillary type. The diaphragm 55 is connected to the movable member, the jet-pipe relay 42, by means of a rod 63 also connecting the relay with the pendulum 40.

The operation of the device shown in Fig. 2 is as follows:

It may be assumed that the craft 12 be inclined with respect to the horizontal to descend. Accordingly, the pendulum 40 is supposed to move clockwisely to displace the jet-pipe 42 to the right to register with the orifice of the conduit 45 and to actuate the elevator 47 accordingly. Since the plane descends at an increasing rate of speed a ballistic force is exerted on the pendulous mass 40 in the direction of the arrow 7 counter-acting the gravitational force. The effect of the ballistic force is now compensated as follows:

The increasing rate of travel of the plane causes the dynamic pressure on the orifice 48 to increase, thereby moving the piston 50 to the right and setting up a flow through the conduit 59 into the diaphragm chambers 57 and 58. A differential pressure will accordingly be exerted on the diaphragm 55 which is a function of the acceleration of the craft. Under the action of the differential pressure the diaphragm 55 moves the rod 63 to the right moving the jet-pipe 43 to register with the orifice of the conduit 45 and counteracting the ballistic force acting on the pendulum. By proper adjustment of the throttle 62 the "compensating action" of the diaphragm 55 can easily be made to counteract disturbing effects of accelerations on the pendulum.

In Fig. 3 a modified form of the invention is shown in which the impulse proportional to the acceleration of the plane is derived in a different manner. The engine 64 for driving the craft is shown as connected to a blower 65 by means of a shaft 66, thereby causing the blower to create a pressure which is a function of the rate of the engine. The pressure created by the blower is conducted by means of a conduit 67 to act on one side of a differential pressure diaphragm 68, the other side of which is connected to be acted upon by the pressure inside a container 69 with a charge of compressible pressure fluid. Both sides of the diaphragm are connected over a variable throttle 70 preferably of the capillary type. A pendulous mass 71 pivoted at 72 is connected by means of a rod 73 with a movable member shown in the embodiment a pointer 74 cooperating with a graduated scale 75. The rod 73 further connects the diaphragm 68 with the movable member 74 and the pendulous mass 71.

The operation of the device shown in Fig. 3 is as follows:

It may be assumed that the craft on which the device is mounted is travelling in the direction of the arrow 8 and that the longitudinal axis of the craft is inclined with respect to the horizontal to cause the craft to descend. The pendulous mass will accordingly be again under the influence of the gravitational force tending to displace the pendulum in a clockwise direction while the ballistic force acts in the opposite direction. Due to the increase in speed of the craft the engine 64 will be accelerated resulting in an increase in pressure created by the blower 65. This increase in pressure results in a flow through the conduit 67 towards the container 69. Correspondingly a force is exerted on the differential pressure diaphragm 68 tending to move the same to the left and moving the pointer 74 in opposition to the ballistic force acting on the pendulous mass 71.

Obviously the present invention is not restricted to the particular embodiment herein shown and described. Moreover it is not indispensable that all the features of this invention be used conjointly, since they may be advantageously employed in various combinations and subcombinations.

What is claimed is:

1. Attitude responsive apparatus for craft comprising, in combination, a pendulous mass; means forming a chamber containing a charge of compressible fluid; a differential pressure responsive device connected to be differentially acted upon by changes in the dynamic pressure on the craft by the surrounding fluid relatively to the pressure inside said chamber; a constricted conduit bridging the two sides of said differential pressure responsive device; and means connecting said device to said mass to counteract the effects of ballistic forces thereon.

2. Attitude responsive apparatus for aircraft comprising, in combination, a pendulous mass mounted for oscillating movement transversely to the craft; a movable member actuated by said mass; a first container charged with air; a first differential pressure responsive device connected to be differentially acted upon by changes in the dynamic pressure on the starboard side of the craft by the surrounding air relatively to the pressure inside said first container; a first constricted conduit bridging said first differential pressure responsive device; a second container charged with air; a second differential pressure responsive device connected to be differentially acted upon by changes in the dynamic pressure on the port side of the craft by the surrounding air relatively to the pressure inside said second container; a second constricted conduit bridging said second differential pressure responsive device; and means connecting said pressure responsive devices to said mass to counteract the effects of ballistic forces thereon.

3. Attitude responsive apparatus for aircraft comprising, in combination, a pendulous mass mounted for oscillating movement in the longitudinal direction of the craft; a movable member actuated by said mass; a cylinder; a piston movable in said cylinder and dividing said cylinder into a first and a second chamber, said first chamber being connected to be acted upon by the dynamic pressure on the craft by the surrounding air; means for biasing said piston relatively to said cylinder into a predetermined position; a differential pressure responsive device connected to be differentially acted upon by the pressure inside the second chamber and by the static pressure of the surrounding air; a constricted conduit bridging said differential pressure responsive device; and means connecting said device to said mass to counteract the effects of ballistic forces thereon.

4. Attitude responsive apparatus for aircraft comprising, in combination, means for creating a fluid pressure proportional to the speed of the aero engine; a pendulous mass; a movable member actuated by said mass; means forming a chamber containing a charge of compressible pressure fluid; a differential pressure responsive device connected to be differentially acted upon by the speed-proportional pressure and by the pressure inside said chamber; a constricted conduit bridging said differential pressure responsive device; and means connecting said device to said mass to counteract the effects of ballistic forces thereon.

5. In an attitude responsive apparatus for craft, a pendulous mass; means forming a chamber containing a charge of compressible fluid; a differential pressure responsive device connected to be differentially acted upon by changes in fluid pressure originated with linear accelerations of the craft relatively to the pressure inside said chamber; a constricted conduit bridging the two sides of said differential pressure responsive device; and means connecting said device with said apparatus to counteract the effects of ballistic forces thereon.

GUIDO WÜNSCH.